US012144287B2

(12) United States Patent
Fischer et al.

(10) Patent No.: US 12,144,287 B2
(45) Date of Patent: Nov. 19, 2024

(54) AGRICULTURAL HARVESTING MACHINE WITH A MONITORING ASSEMBLY TO SENSE HARVESTED MATERIAL FLOW IN THE AGRICULTURAL HARVESTING MACHINE

(71) Applicant: CLAAS Selbstfahrende Erntemaschinen GmbH, Harsewinkel (DE)

(72) Inventors: Frédéric Fischer, Arnsberg (DE); Marvin Barther, Steinhagen (DE); Dennis Neitemeier, Lippetal (DE); Maik Heufekes, Münster (DE); Sven Carsten Belau, Gütersloh (DE); Johann Witte, Fröndenberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 695 days.

(21) Appl. No.: 17/356,144

(22) Filed: Jun. 23, 2021

(65) Prior Publication Data

US 2022/0053692 A1 Feb. 24, 2022

(30) Foreign Application Priority Data

Jun. 29, 2020 (DE) .......................... 102020117071.8

(51) Int. Cl.
*G06T 7/00* (2017.01)
*A01D 41/127* (2006.01)
(Continued)

(52) U.S. Cl.
CPC ..... *A01D 41/1277* (2013.01); *A01D 41/1271* (2013.01); *G06T 7/0002* (2013.01);
(Continued)

(58) Field of Classification Search
CPC ......... G06T 2207/30128; G06T 7/0004; G06T 2207/30188; G06T 7/0002; G06V 20/188; G06V 20/68
See application file for complete search history.

(56) References Cited

U.S. PATENT DOCUMENTS 5,821,992 A 10/1998 Saylor
6,442,916 B1 9/2002 Pope
(Continued)

FOREIGN PATENT DOCUMENTS

EP 0940656 A1 9/1999
EP 1479280 A1 * 11/2004 ......... A01D 41/1276
(Continued)

OTHER PUBLICATIONS

European Search Report for European Application No. 21176852.8-1004 dated Nov. 23, 2021.

*Primary Examiner* — Ian L Lemieux
*Assistant Examiner* — Sebastian-Sy Vuchi Ngo
(74) *Attorney, Agent, or Firm* — Lempia Summerfield Katz LLC (57) ABSTRACT

An agricultural harvesting machine, with at least one work assembly and a monitoring assembly, is disclosed. The agricultural harvesting machine transports harvested material in a harvested material flow along a harvested material transport path. The monitoring assembly includes an measuring system positioned on the harvested material transport path and an evaluation device configured to determine at least one harvested material parameter. The measuring system includes a first passive optical sensor that senses image data indicative of visible light in a first section and a second non-passive non-optical sensor that senses data in a second section that at least partly overlaps the first section. The evaluation device correlates the image data for the overlapping section from the first optical sensor and the data from (Continued)

the second optical sensor and determines, based on the correlation, at least one harvested material parameter.

20 Claims, 4 Drawing Sheets

(51) Int. Cl.
 *G06V 10/80* (2022.01)
 *G06V 20/10* (2022.01)
 *G06V 20/68* (2022.01)
(52) U.S. Cl.
 CPC ............ *G06V 10/80* (2022.01); *G06V 20/188* (2022.01); *G06V 20/68* (2022.01); *G06T 2207/30188* (2013.01)

(56) References Cited

U.S. PATENT DOCUMENTS

| | | | |
|---|---|---|---|
| 7,654,141 B2 | 2/2010 | Behnke | |
| 7,804,588 B2 | 9/2010 | Kormann et al. | |
| 8,045,168 B2 | 10/2011 | Missotten et al. | |
| 8,115,923 B2 | 2/2012 | Priesnitz et al. | |
| 9,468,807 B1* | 10/2016 | Krueger | A63B 24/0075 |
| 9,648,807 B2 | 5/2017 | Escher et al. | |
| 10,034,423 B2* | 7/2018 | Dybro | A01D 41/127 |
| 10,212,883 B2 | 2/2019 | Quincke | |
| 2008/0186487 A1 | 8/2008 | Kormann et al. | |
| 2009/0258684 A1 | 10/2009 | Missotten et al. | |
| 2010/0110428 A1 | 5/2010 | Priesnitz et al. | |
| 2015/0015697 A1* | 1/2015 | Redden | G01B 11/24 382/110 |
| 2015/0245560 A1* | 9/2015 | Middelberg | A01D 41/1271 460/7 |
| 2020/0084966 A1* | 3/2020 | Corban | A01D 45/30 |
| 2021/0400871 A1* | 12/2021 | Fischer | A01D 41/1277 |

FOREIGN PATENT DOCUMENTS

| | | |
|---|---|---|
| EP | 1956361 A2 | 8/2008 |
| EP | 2189781 A2 | 5/2010 |
| EP | 2826356 A1 | 1/2015 |
| WO | 2006010761 A1 | 2/2006 |
| WO | 2012163751 A1 | 12/2012 |

\* cited by examiner

AGRICULTURAL HARVESTING MACHINE WITH A MONITORING ASSEMBLY TO SENSE HARVESTED MATERIAL FLOW IN THE AGRICULTURAL HARVESTING MACHINE

CROSS REFERENCE TO RELATED APPLICATION

This application claims priority under 35 U.S.C. § 119 to German Patent Application No. DE 102020117071.8 filed Jun. 29, 2020, the entire disclosure of which is hereby incorporated by reference herein.

TECHNICAL FIELD

The invention relates to an agricultural harvesting machine that includes a measuring system to generate sensor data and an evaluation device to determine, based on the sensor data, at least one harvested material parameter.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Agricultural harvesting machines, such as, for example, combines and forage harvesters, are configured to harvest a crop from a field and to process the harvested material thus obtained by using a series of work assemblies. In principle, the crop may already have different qualities. To an extent, however, the quality of the crop may still be influenced by the harvesting process. In particular, a great deal of importance may be ascribed to the separation of grain components and non-grain components. In this regard, it may be important to determine the quality, or some other type of harvesting parameter, of the harvested material in order to directly correct the harvesting process and/or to record as information and for documentation.

U.S. Pat. No. 9,648,807 B2 (incorporated by reference herein in its entirety) discloses an agricultural harvesting machine that transports the harvested material in a harvested material flow along a harvested material transport path through the harvesting machine. The agricultural harvesting machine includes a control assembly that has a measuring system at least partly arranged or positioned on the harvested material transport path to analyze the composition and/or contents of the harvested material. The measuring system has an optical sensor for the spatially-resolved recording of visible light of a visible wavelength range within a field of vision. In a measuring routine, the optical measuring system records image data from the optical sensor within the visible wavelength range that depict the harvested material within a section of the harvested material flow. The optical sensor in the agricultural harvesting machine may comprise a commercially-available camera. Moreover, the harvesting machine has an evaluation device for determining a harvested material parameter.

DESCRIPTION OF THE DRAWINGS

In the following, the invention will be further explained with reference to a drawing only representing exemplary embodiments. In the drawing, FIG. 1 illustrate a schematic side view of a combine as a proposed agricultural harvesting machine.

DETAILED DESCRIPTION

As discussed in the background, various measuring methodologies are used. However, each measuring methodology has advantages and disadvantages. In particular, optical measurements with cameras may be useful and flexible. However, when measuring physical properties of the harvested material, cameras quickly reach their limits. It is, for example, possible to optically distinguish between husks and grains; it may be, however, difficult to impossible to discern whether a husk is still hiding a grain, or whether the husk is empty.

Thus, in one or some embodiments, the disclosed agricultural harvesting machine is directed to improving or optimizing the determination of harvested material parameters.

In one or some embodiments, multiple optical measurements, such as a passive optical measurement from a first, passive optical sensor with another measurement from a second, non-passive optical sensor, are combined (such as locally combined). In this regard, the multiple optical measurements may be different in one or more aspects, such as passive versus non-passive, and may be the same in one or more aspects, such as optical. In one or some embodiments, this combination of sensor data is directed to combining the sensor data for an overlapping section of the harvested material. The same section of the harvested material may therefore be analyzed using the two measuring methods, with the sensor results from the two measuring methods being correlated with each other, and the harvested material parameter being determined based on both measurements (such as based on the correlation of the two measurements). In this way, it may effectively eliminate the disadvantage of optical measurement when detecting physical properties within the same measuring region (e.g., the overlapping section).

In particular, in one or some embodiments, the measuring system has a second, non-passive optical (e.g., non-passive and/or non-optical) sensor for recording sensor data in a measuring field; within the measuring routine, the measuring system records measured values from the second sensor that depict the harvested material within a second section of the harvested material flow; the first and the second section at least partially overlap in an overlapping section; and in an analysis routine, the evaluation apparatus correlates the image data from the first sensor on the overlapping section and the measured values from the second sensor on the overlapping section with each other, and thereby determines the harvested material parameter based on the correlation.

In one or some embodiments, spatially-resolved measurement(s) may be performed using the first sensor and/or the second sensor. In particular, the first sensor may be configured for the spatially-resolved recording of light within the field of vision. In the measuring routine, the measuring system may record or sense spatially-resolved image data from the first sensor within the wavelength range that depict the first section of the harvested material, and/or the second sensor is configured to record or sense the spatially-resolved sensor data within the measuring field. In the measuring routine, the measuring system may thus record spatially-resolved measured values from the second sensor that depict the second section of the harvested material, for example such that the evaluation apparatus determines the harvested material parameter in the analysis routine in a spatially-resolved manner. These embodiments may be particularly interesting from various vantage points. On the one hand, spatially-resolved cameras are economical. On the other hand, the advantages of optical sensors in spatially-resolved measurements are particularly pronounced given the many image processing algorithms. Since many harvested material parameters are also locally very inhomogeneous, in particular spatially-resolved measurement by means of both sensors is of great importance. Accordingly, for example, husks and grains may be distinguished by means of the optical measurement, and whether the husk is empty can be detected by means of the other measurement given a correspondingly high spatial resolution. Even this example indicates how entirely new analytical possibilities are opened up by means of double spatially-resolved measurement.

Another particularly preferred embodiment is the subject matter of claim 3. Accordingly, the second sensor can comprise at least one electromagnetic sensor element. Thus, in the measuring routine, the measuring system may record sensor data from the second sensor that depicts an electrical and/or magnetic property of the second section of the harvested material (e.g., the electrical property is any one, any combination, or all of an impedance, a capacitance, an inductance, a resistance, or a parameter of an electrical field (e.g., the permittivity or the conductivity); and/or the magnetic property is a parameter of a magnetic field (e.g., the permeability). Grain components and nongrain components sometimes have very different electrical and magnetic properties. Thus, since electromagnetic measurements may also frequently be performed economically and robustly, much data can thereby be determined with very little effort.

In one or some embodiments, the at least one electromagnetic sensor element may comprise a capacitive electrode. In addition or alternatively, the second sensor may be operated a contact-free sensor so that the measuring system in the measuring routine measures the electrical property capacitively, such as in a projected capacitive manner, using the second sensor. Sophisticated capacitive electrodes, used in the field of smartphones, may be used in the present context. Capacitive electrodes, in particular, also permit high spatial resolution, thereby enabling various types of analysis, such as the analysis of individual grains and nongrain components.

In one or some embodiments, the first sensor is configured to record visible and/or invisible light from at least one visible and/or invisible wavelength range within the field of vision. In particular, the first sensor may comprise a camera, such as an RGB camera, or the first sensor may comprise a multispectral camera or a hyperspectral camera.

In one or some embodiments, the measuring system includes a housing, with the first sensor and/or the second sensor being arranged or positioned at least partly within the housing (such as one or both of the first sensor and/or the second sensor being arranged or positioned entirely within the housing).

In one or some embodiments, the measuring system includes a transparent window. In a particular embodiment, the light emanating from the harvested material and recorded or sensed by the first sensor traverses through the transparent window and therefrom to the first sensor, which is positioned completely within the housing.

In one or some embodiments, at least one electromagnetic sensor element of the second sensor is arranged or positioned on the transparent window. In particular, the at least one electromagnetic sensor element of the second sensor arranged or positioned on the transparent window is arranged inside or outside of the field of vision, with the field of vision and the measuring field at least partially overlapping each other locally.

Thus, a transparent window, on the one hand, may be transparent to light for the first sensor to be recorded, and on which, on the other hand, the second sensor can be arranged. In particular in combination with a capacitive measurement, optical and capacitive measurement is therefore possible at the same location using a touch screen-like technique. The corresponding measuring data may therefore directly correspond and may be used for joint analysis (e.g., in order to determine the harvested material parameter).

In one or some embodiments, the agricultural harvesting machine includes a grain elevator, with any one, any combination, or all of the first optical sensor, the second optical sensor, the transparent window, or the housing being arranged or positioned on the grain elevator, such as under or over the grain elevator. Alternatively, or in addition, the overlapping section may be part of a bottom side or a top side of a harvested material flow along the harvested material transport path.

In one or some embodiments, various determinable harvested material parameters are contemplated. In particular, the harvested material parameter may relates to any one, any combination, or all of: a grain portion; a broken grain portion; a non-grain portion (e.g., any one, any combination, or all of a portion of awns, unthreshed components, straw, or stem parts and/or silage); a grain moisture; a straw moisture; or a content of the harvested material (e.g., a protein content and/or starch content).

In one or some embodiments, a method for operating an agricultural harvesting machine is disclosed whereby the agricultural harvesting machine harvests a crop and processes harvested material, whereby the agricultural harvesting machine performs the measuring routine using the optical measuring system, and whereby the agricultural harvesting machine performs the analysis routine using the evaluation apparatus.

Figure 1:
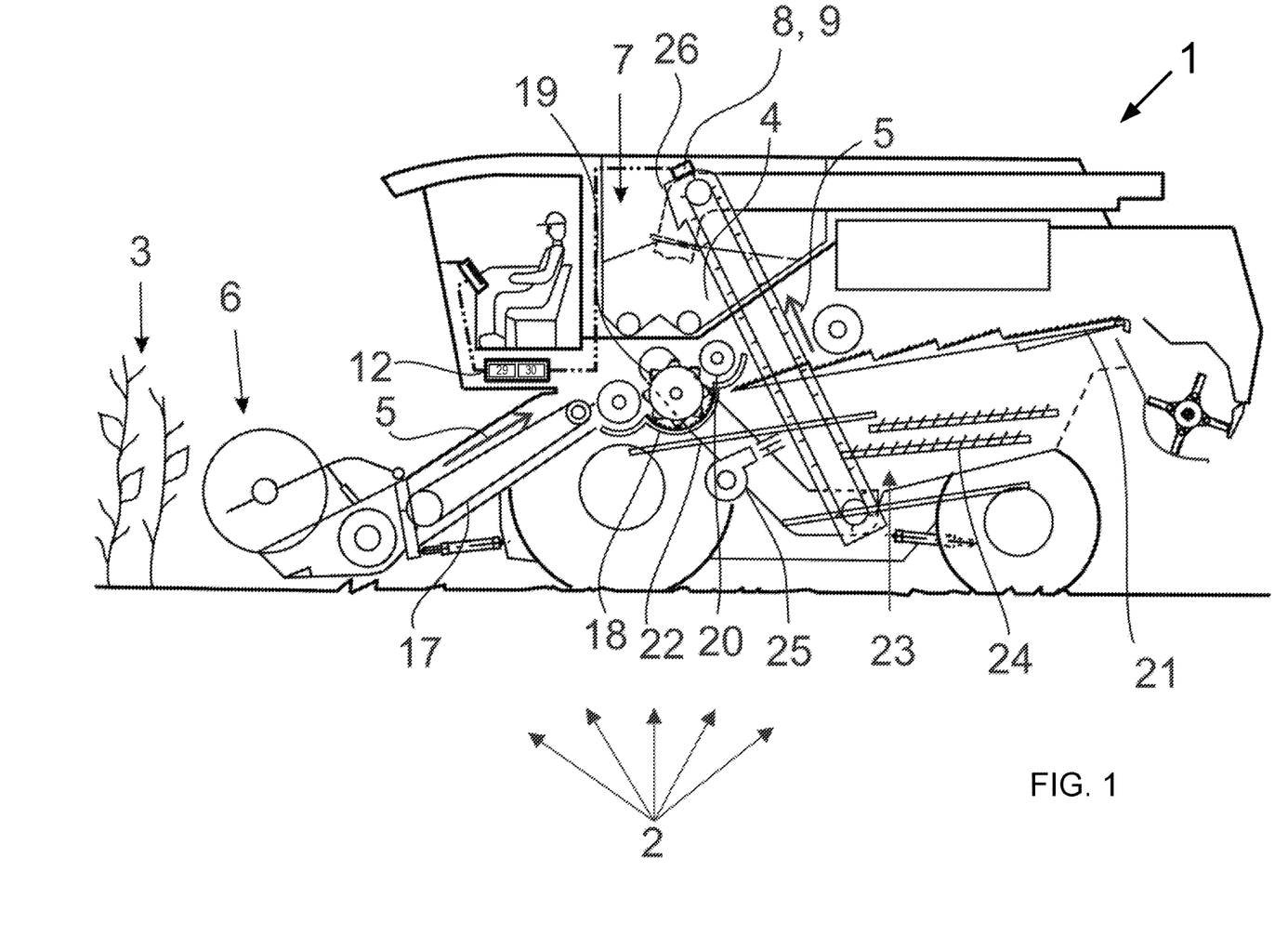

Referring to the figures, the agricultural harvesting machine shown in FIG. 1, which may comprise a combine 1, has at least one work assembly 2 for harvesting a crop 3 and for processing harvested material 4 of the crop 3. Alternatively, the agricultural harvesting machine may comprise a forage harvester. While the harvesting machine is operating, the harvested material 4 is transported in a harvested material flow along a harvested material transport path 5 through the harvesting machine.

While being transported through the harvesting machine, the harvested material 4 forms a harvested material flow. In one or some embodiments, the term "harvested material flow" comprises the flow of the plant parts of the crop 3 to be processed on the harvested material transport path 5. In this case, this harvested material transport path 5 begins, especially in a combine 1, with a cutting unit 6 and proceeds to the grain tank 7. In one or some embodiments, the harvested material flow may be divided into a main harvested material flow and smaller partial harvested material flows. The term "main harvested material flow" then identifies the part of the harvested material flow that contains the majority of the harvested material 4 relative to the overall harvested material transport path 5. Partial harvested material flows on a smaller scale that branch off, such as for analytical purposes, are not included.

Figure 2:
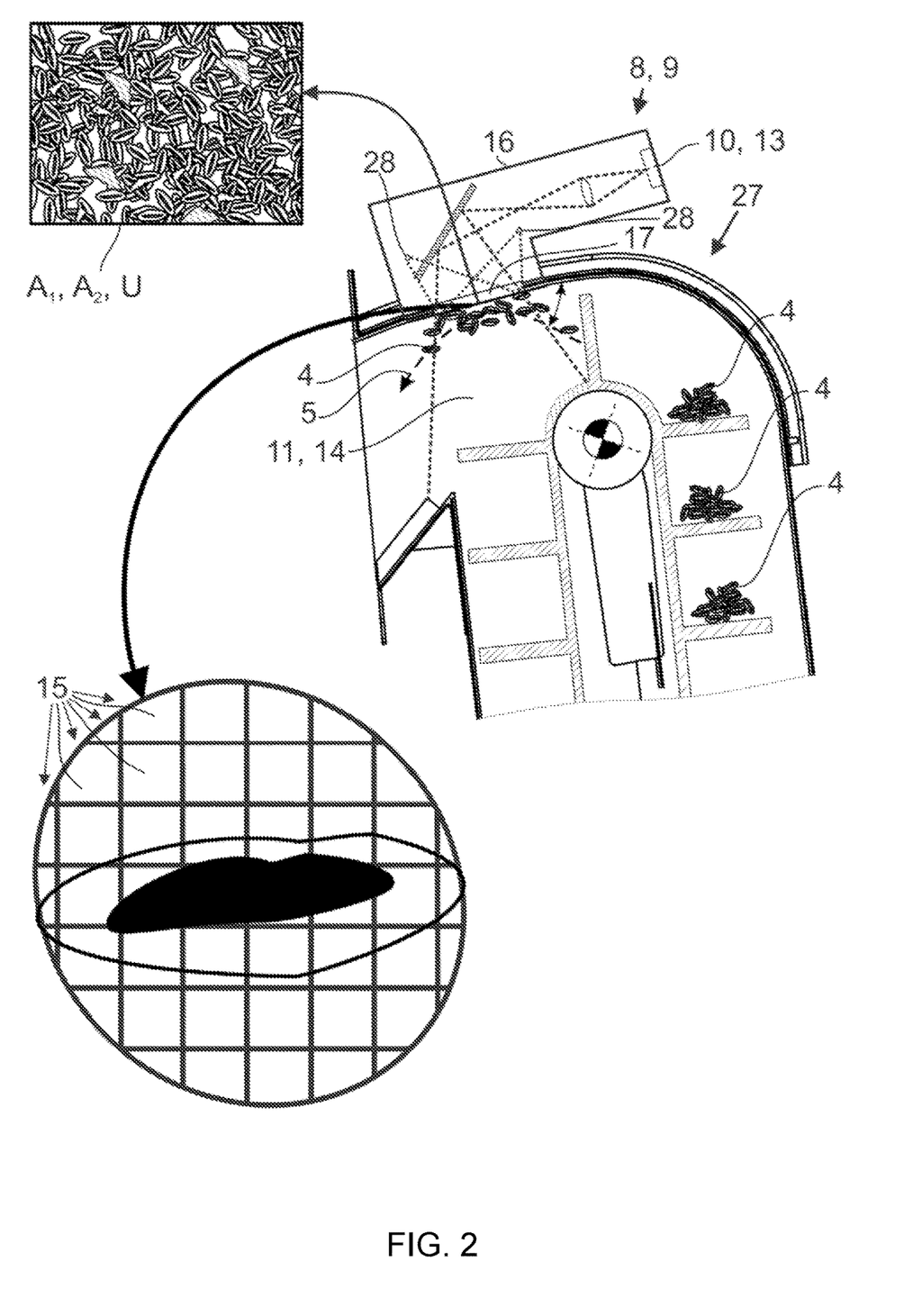
FIG. 2 illustrates a schematic side view of a grain elevator of the combine from FIG. 1 with a proposed optical measuring system.

The agricultural harvesting machine has a monitoring assembly 8 that has an optical measuring system 9 arranged or positioned on the harvested material transport path 5 for analyzing the harvested material 4. The analysis of the harvested material may include an analysis of the composition (e.g., any one, any combination, or all of share of undamaged grain, share of broken grain, or share of non-grain, etc.) of the harvested material in the harvested material flow, and/or an analysis of the contents (e.g., any one, any combination, or all of moisture content, protein content, starch content, sugar content, or fat content, etc.) of certain plant components in the harvested material flow, such as the grain.

The measuring system 9 may include a first, passive optical sensor 10 for recording or sensing light from a wavelength range within a first field of vision 11.

In one or some embodiments, "passive optical sensors" comprises optical sensors that in principle may be operated using ambient light. At the same time, it is of course not excluded that the measuring system 9 may emit active light, as will be explained further below. In one or some embodiments, the emission of light itself may not be part of the measurement. For example, laser scanning systems such as LIDAR in which a use of ambient light is incompatible with the sensor are therefore not considered passive. Contrastingly, a specific, even sequential, illumination of the measuring region in which the measuring principle could also be used with a filter, is in the present case ascribed to or included as the passive optical sensors.

All light-sensitive sensors, such as sensors based on the photoelectric effect, may be considered optical sensors. In the present case, a broad definition of optical system and light is used so that infrared radiation and ultraviolet radiation are also considered light and part of the optical system.

In one or some embodiments, the term "field of vision" may relate to the three-dimensional space from which light can contact the optical sensor through the corresponding optical system. The field of vision in general parlance may also be frequently expressed as the English term "field-of-view". The measuring field may be analogous to three-dimensional space from which measured values can be recorded.

In a measuring routine, the optical measuring system 9 may record image data from the first optical sensor 10 within the wavelength range that depict the harvested material 4 within a first section $A_1$ of the harvested material flow. The term "image data" in this case may be understood broadly, and may very generally relate to sensor data from or generated by an optical sensor. In one or some embodiments, the section of the harvested material 4 may be the part of the harvested material 4 visible to the optical sensor at the time of recording. In particular, the section of the harvested material 4 relates to the uncovered part of the harvested material 4 located within the field of vision.

The harvesting machine moreover includes an evaluation device 12 for determining one or more harvested material parameters, such as relating to the composition and/or contents of the harvested material 4. The evaluation device 12 may comprise any type of computing functionality, such as at least one processor 29 (which may comprise a microprocessor, controller, PLA, or the like) and at least one memory 30 in order to perform the functions described herein, such as, for example, analyzing sensor data and/or determining one or more harvested material parameters. The memory may comprise any type of storage device (e.g., any type of memory). Though the processor 29 and memory 30 are depicted as separate elements, they may be part of a single machine, which includes a microprocessor (or other type of controller) and a memory.

The processor 29 and memory 30 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

In one or some embodiments, the measuring system 9 includes a second, non-passive optical sensor, such as non-optical sensor 13, for recording, sensing or generating the sensor data in a measuring field 14. In the measuring routine, the measuring system 9 is configured to record or sense measured values from the second sensor 13 that depict the harvested material 4 within a second section $A_2$ of the harvested material flow.

In one or some embodiments, the second sensor 13 may be based on a non-passive optical (e.g., non-passive and/or non-optical) measuring principle, such as laser scanning including LIDAR. In one or some embodiments, the second sensor 13 is however based on a non-optical measuring principle. It is contemplated that all measuring principles may be used with which harvested material parameters may be determined, or from which harvested material parameters may be derived. In one particular implementation, mechanical measuring principles may be used. These mechanical measuring principles may be configured to measure temperature and/or measure weight. It is also contemplated that acoustic measuring principles, such as ultrasound, may be used. It is further contemplated that measuring principles based on electromagnetic waves outside of the optical range, such as radar or x-ray, may be used. Electrochemical measuring principles are also contemplated. In addition, other measuring principles for measuring temperature or moisture are contemplated.

In one or some embodiments, electrical measuring principles are used, such as any one, any combination, or all of thermoelectric, piezoelectric, capacitive, inductive or resistive measuring principles. In a specific embodiment, magnetic measuring principles are used. This may include magnetoelastic measuring principles and measuring principles based on magnetic resonance.

The dependency of the particular measured values and the harvested material parameter to be determined may be ascertained experimentally. For all of the mentioned measuring principles, various sensors are known that may be used, potentially with corresponding but acceptable reductions in precision, in agricultural harvesting machines. In this regard, both the various measuring principles as well as the sensors to generate data in accordance with the various measuring principles (and in turn using the generated data to determine the harvested material parameter(s)) are contemplated.

In one or some embodiments, the first sensor 10 may be based on the photoelectric effect. The second sensor 13 may be based on a non-optical measuring principle and not based on the photoelectric effect (e.g., non-photoelectric effect).

The second section $A_2$ may be two-dimensional or three-dimensional, depending on the measuring principle. In one or some embodiments, the second section $A_2$ is configured as a relatively thin layer.

The first section $A_1$ and the second section $A_2$ may overlap at least partially in an overlapping section U. In an analysis routine, the evaluation apparatus 12 may correlate the image data generated from the first sensor 10 on the overlapping section U and the measuring data generated from the second sensor 13 on the overlapping section U with each other, and thereby determines, based on the correlation, the harvested material parameter(s).

Various correlations performed by the evaluation device are contemplated. In this regard, the term "correlate" is to be understood broadly in this context. In one or some embodiments, the image data from the first optical sensor 10 and the second optical sensor 13 may be used together or analyzed in combination (e.g., any one, any combination, or all of an additive sense, a subtractive sense, a difference sense, or a sameness sense) to determine the harvested material parameter and, in so doing, are processed together to determine the harvested material parameter. To accomplish this, experimental dependencies may, for example, be determined between the image data.

Figure 3A:
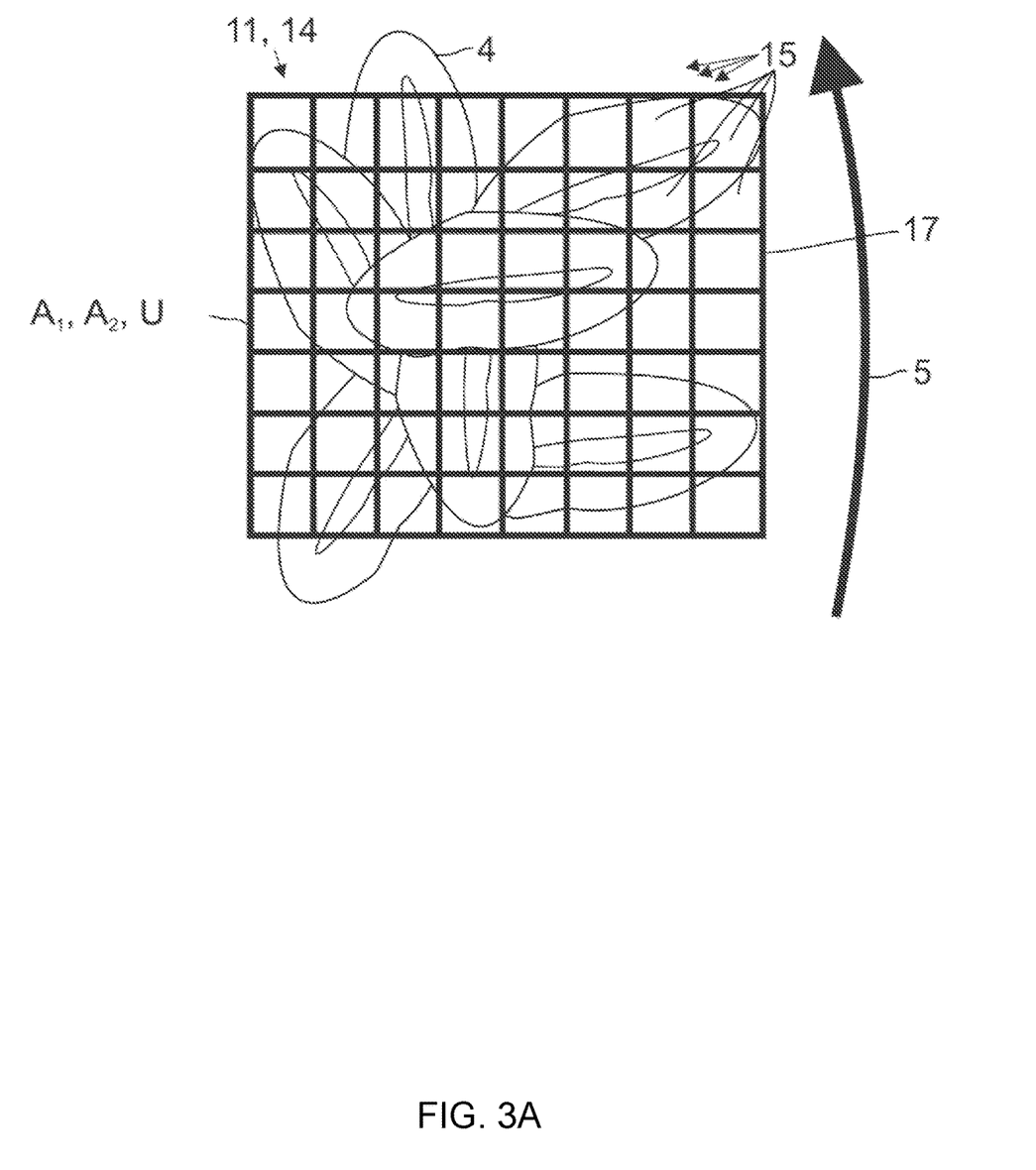
FIGS. 3A-B illustrate two contemplated arrangements of electromagnetic sensor elements in relation to the field of vision.
Figure 3B:
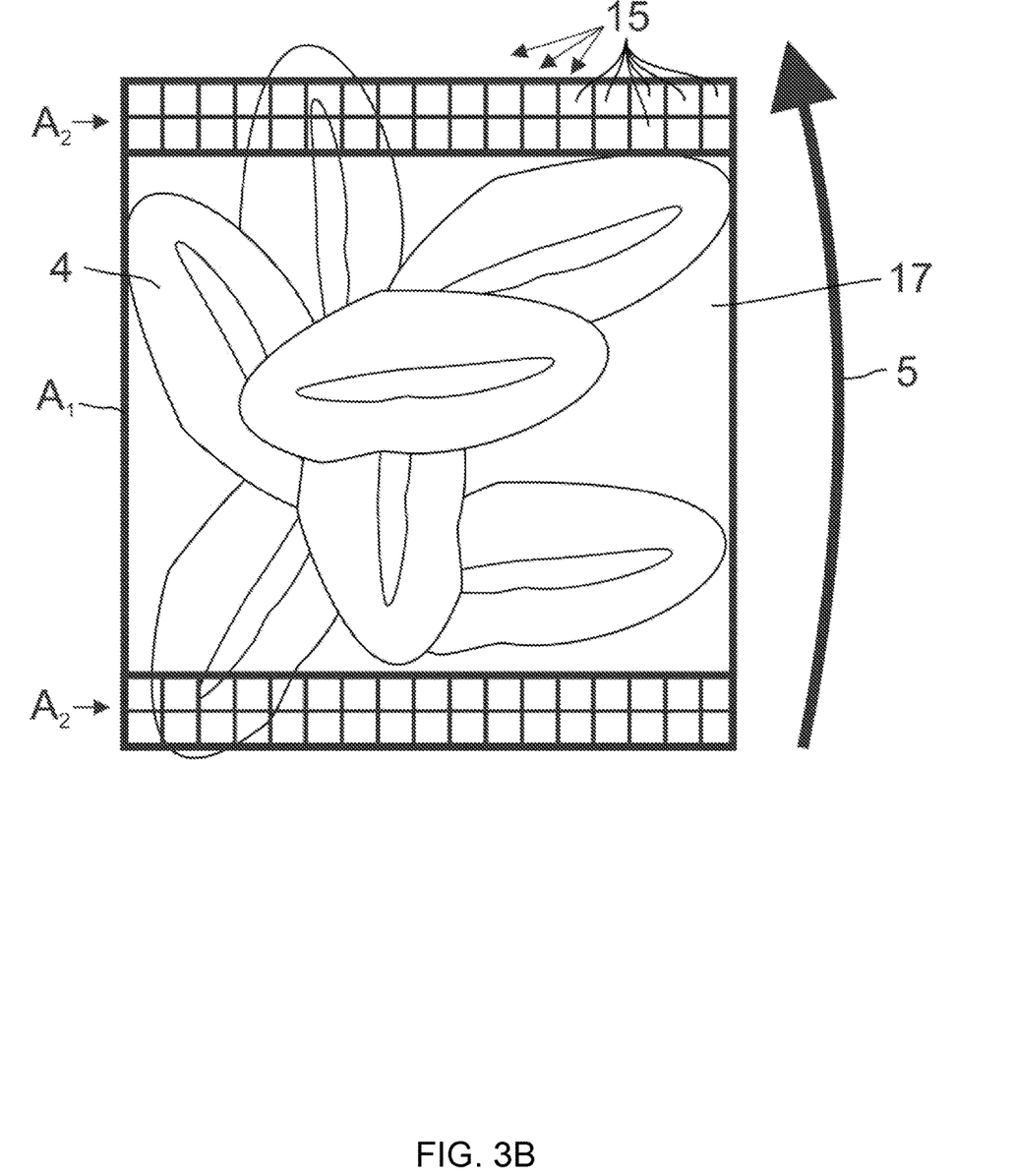

The overlapping section U may be resolved temporally and/or spatially. As explained with reference to FIG. 3, a time-delayed measurement of the overlapping section may take place, for example, in that the harvested material 4 is transported along the harvested material transport path 5, and first transported past the first sensor 10 or the second sensor 13 and then past the other sensor 13, 10. Since, in one or some embodiments, the evaluation apparatus 12 is aware of a speed of the harvested material flow (e.g., the evaluation device may access a pre-determined speed of the harvested material flow or may receive as input via another sensor (not shown) the speed of the harvested material flow), the overlapping section U may be calculated using the speed of the harvested material flow in the image data and measured values. Alternatively or in addition, the overlapping section U may be formed spatially and/or locally (e.g., by an overlap of the first field of vision 11 and the second field of vision 14).

In one or some embodiments, the harvested material transport path 5 may always run at least partially (or only partially) through the first and through the second field of vision 11, 14. In this case, the overlapping section U relates to the harvested material flow and in particular the main harvested material flow. A static measurement is, however, also contemplated.

One example of a harvested material parameter that may be determined is a non-grain portion. After the threshing of the harvested material 4, it may be desirable for as many grains as possible to be freed from the husks. Using an optical measuring system, it may however be very difficult or impossible to determine whether a grain is still present in a husk. With a husk in the overlapping section U that is only depicted two-dimensionally by the first sensor 10, three-dimensional information relating to the content of the husk may be determined using the second sensor 13. Accordingly, the permittivity and the permeability of a husk with grain are for example different from a husk without grain. For example, the relative permittivity of non-grain components may lie within a range of 1.5, whereas the relative permittivity of wheat grains may lie within a range of 3 to 8. In this case and preferably, these regions are distinguishable using the second sensor. Thus, the second sensor may generate data in order for the optical measuring system to determine the permittivity, and based on the determined permittivity, conclude whether the components sensed are non-grain components or wheat grains (e.g., if the determined permittivity is in the range of 3 to 8, the optical measuring system determines that the components are wheat grains; otherwise, the optical measuring system determines that the components are non-grain components).

In one or some embodiments, it may be of particular interest when the image data and/or the measured values are spatially-resolved. In this case, the harvested material parameter may then be determined in a spatially-resolved manner by using individual components, such as grains and husks, of the harvested material 4.

Correspondingly, In one or some embodiments, the first sensor 10 is configured for the spatially-resolved recording of light within the field of vision 11 and, in the measuring routine, the measuring system 9 records spatially-resolved image data from the first sensor 10 within the wavelength range that depict the first section $A_1$ of the harvested material 4. In addition or alternatively, the second sensor 13 can be configured for the spatially-resolved recording or sensing of sensor data within the measuring field 14 and, in the measuring routine, the measuring system 9 records or senses spatially-resolved measured values from the second sensor 13 that depict the second section $A_2$ of the harvested material 4. In addition or alternatively, the evaluation apparatus 12 may determine the harvested material parameter in a spatially resolved manner in the analysis routine.

In one or some embodiments, the term "spatially resolved" may mean that the field of vision 11 or measuring field 14 of the particular sensor 10, 13 is divided into several partial fields of vision or partial measuring fields that may be distinguished from each other by measuring. The first sensor 10 therefore may have at least two pixels which at least partially have a different partial field of vision. A pixel is a two-dimensional depiction of a partial field of vision. In general parlance, picture elements are frequently also identified by the English term pixel. Analogously, the second sensor 13 may have locally distinguishable measuring points.

In one or some embodiments, the second sensor 13 comprises at least one electromagnetic sensor element 15. The term "electromagnetic" may refer to the variable to be measured that correspondingly is an electrical or magnetic variable. In the measuring routine, the measuring system 9 may record or measure sensor data from the second sensor 13 that at least depict an electrical and/or magnetic property of the second section $A_2$ of the harvested material 4. This recording or sensing may correspondingly be performed by using at least one of the electromagnetic sensor elements 15.

The electrical property may be any one, any combination, or all of: an impedance; a capacitance; an inductance; a resistance; or a parameter of an electrical field (e.g., the permittivity and/or the conductivity). In addition or alternatively, the magnetic property may be a parameter of a magnetic field, such as the permeability. The particular property does not have to be expressly calculated, but rather only depicted by the measurement data (e.g., calculable therefrom). Several properties may also be measured, if applicable using different measuring principles.

The at least one electromagnetic sensor element 15 of the second sensor 13 may be a capacitive electrode. In one or some embodiments, the second sensor 13 has many capacitive electrodes. Various capacitive electrodes are contemplated, such as those used in the technology of touchscreens. Accordingly, the electromagnetic sensor elements 15 of the second sensor 13, such as the capacitive electrodes, may form a grid that measures the electromagnetic property, such as capacitance, in a spatially-resolved manner.

In one or some embodiments, the measuring system 9 may operate the second sensor 13 in the measuring routine as a contact-free sensor. Particularly with capacitive sensors, an advantage is that they do not have to come into direct contact with the harvested material 4.

In one or some embodiments, the measuring system 9 in the measuring routine measures the electrical property capacitively, such as in a projected capacitive manner, using the second sensor 13. In projected capacitive measurement, a pattern, such as a matrix of capacitors, is formed from two conductive patterns that in particular each function as matrices comprising (or consisting of) capacitor electrodes. Once an object penetrates or enters into the field of one of the capacitors, the capacitance and/or change in capacitance is accordingly measurable in a spatially-resolved manner without the object having to come into direct contact with the capacitor. In one or some embodiments, the second sensor 13 has at least 10, at least 100, or at least 1,000 electromagnetic sensor elements 15.

FIGS. 3A-B illustrates two options of forming the overlapping section U. In FIG. 3A, the field of vision 11 and the measuring field 14 mostly overlap each other locally or are even identical. Contrastingly, in FIG. 3B, the measuring field 14 is arranged along the harvested material transport path 5 before and after the field of vision 11 with respect to the direction of transport of the harvested material 4. The overlapping section U is then formed by a delay of the measuring times of the measurements.

The first sensor 10 may be configured to record visible and/or invisible light from at least one visible and/or invisible wavelength range within the field of vision 11. Given the definitions of the visible wavelength range that sometimes differ slightly from each other, visible light is understood in this context to mean a wavelength range between 380 nm and 780 nm. In one or some embodiments, the first sensor 10 comprises a camera, such as an RGB camera. Alternatively, the first sensor 10 may be a multispectral camera or a hyperspectral camera.

An RGB camera is a color camera that has a least one red, at least one green, at least one blue color channel. The RGB camera may therefore record three distinguishable wavelength ranges. It is normally the case that the sensor elements of the camera are distributed to the wavelength ranges by means of a color filter, in particular in the manner of a Bayer pattern. A multispectral camera generally has at least two distinguishable wavelength ranges and one spatial resolution. A hyperspectral camera also has spatial resolution and records one spectrum per pixel with at least 50 distinguishable wavelength ranges in this case.

In one or some embodiments, the measuring system 9 has a housing 16. The first sensor 10 and the second sensor 13 may be arranged or positioned at least partly within the housing 16. In a particular embodiment, one or both of the first sensor 10 and the second sensor 13 are entirely within the housing 16. Alternatively, only a part of the particular sensor 10, 13 is arranged or positioned in the housing 16; in particular, all light-receptive sensor elements of the optical sensor 10 and/or all electromagnetic sensor elements 15 of the second sensor 13 may be arranged or positioned in the housing 16.

In one or some embodiments, the measuring system 9 may include a transparent window 17. In one or some embodiments, the light recorded by the first optical sensor 10 that proceeds from the harvested material 4 (e.g., from the sections $A_1$ of the harvested material 4) traverses through the transparent window 17 and from the transparent window 17 to the first optical sensor 10 (which may be completely within the housing 15). This is illustrated in FIG. 2. In one or some embodiments, the transparent window 17 is part of the housing 16. In one or some embodiments, the transparent window 17 may come into contact with the harvested material 4.

In one or some embodiments, at least one electromagnetic sensor element 15 (such as part or all of the at least one electromagnetic sensor element 15) of the second sensor 13 is arranged or positioned on the transparent window 17. At least one electromagnetic sensor element 15 of the second sensor 13 arranged on the transparent window 17 may be positioned inside or outside of the field of vision 11. In addition or alternatively, the field of vision 11 and the measuring field 14 may overlap each other locally, at least partially.

In one or some embodiments, the transparent window 17 is arranged or positioned under the harvested material transport path 5. In particular, when the harvested material 4 at least temporarily lies on the transparent window 17 or comes into contact therewith while being transported, particularly precise, such as capacitive, measurement is possible.

In one or some embodiments, determining the harvested material parameter for various harvested material parameters and disruptive factors may be determined with different precision and mutual interference using the two sensors 10, 13. In particular, an equation system (which may comprise one or more equations) may be used in which the different factors together form the measuring result of the particular wavelength range. Given a sufficient degree of certainty, this equation system may then be solved. Further, the different measuring principles may have different penetration depth(s) into the harvested material 4, which may allow correspondingly different harvested material parameters and disruptive factors to be measured.

In one or some embodiments, when using the RGB camera, the first optical sensor 10 may be configured for the spatially-resolved recording of visible light from at least two, such as at least three different visible wavelength ranges within the first field of vision 11. The first optical sensor 10 may, in addition or alternatively, be configured for the spatially-resolved recording or sensing of visible light for the entire visible wavelength range within the first field of vision 11. The distinguishable wavelength ranges may be recorded or sensed simultaneously or sequentially. Simultaneous recording may be achieved using a Bayer pattern, light refraction, beam division, etc. Sequential recording may be achieved passively by changing filters in the manner of a filter wheel, or actively by sequential illumination in the different wavelength ranges.

The first optical sensor 10 may be designed as a line scan camera or area scan camera with sensor elements. The sensor elements may each record locally different pixels of the first field of vision 11 that are, in particular, at a distance from each other. In one or some embodiments, the pixels do not overlap. Further, in one or some embodiments, the first optical sensor 10 has at least 1,000 sensor elements, or at least 10,000 sensor elements, that each record the same wavelength range. The first optical sensor 10 therefore has, for example, at least 1 million sensor elements provided with a green filter. In addition or alternatively, the sensor elements may be arranged flat, such as on a common sensor chip. The sensor elements may be designed according to known technologies, for example as CCD sensor elements, or CMOS sensor elements, or InGaAs sensor elements. Depending on the method of counting, the sensor elements may be configured individually or in groups, such as of four, that which is normally also identified by the English term "pixel".

In summary, the first optical sensor 10 may provide for the spatially resolved recording of at least one, such as fewer spectral ranges. In one or some embodiments, the spatial resolution may also be assigned a spectral resolution so that a matrix results from the spatial resolution and spectral resolution. Merely by way of example, this is known to be the case with a Bayer pattern.

In one or some embodiments, the first section $A_1$ may cover at least 50%, such as at least 90%, such as at least 95%, such as at least 99%, or such as 100% of the second section $A_2$. The coverage in this case is meant in terms of time and/or location.

Alternatively with respect to coverage in terms of time, the first section $A_1$ and the second section $A_2$ may overlap at their edges or are at a distance from each other of at most one meter, such as at most one-half meter, or such as at most ten centimeters.

With the combine 1 shown here, the work assembly(ies) 2 include the previously mentioned cutting unit 6 and an auger 18 connected thereto from which the harvested material flow is transferred to a threshing unit 20 surrounded by a threshing concave 19. Using a deflection drum 21, the harvested material flow enters into a separating device 22 designed in this case as a separating rotor in which freely mobile grains of the harvested material flow are deposited in a lower area. From here, the harvested material flow passes via a returns pan 23 to a cleaning device 24 that, as shown here, comprises (or consists of) several screening levels 25 and a blower 26. From here, the grain elevator 27 finally may guide the harvested material flow into the grain tank 7. In one or some embodiments, all of these work assemblies 2 may contribute to the processing of the harvested material 4.

In one or some embodiments, the measuring system 9 is arranged or positioned on the grain elevator 27. Generally speaking, the transparent window 17 may be adjacent to and/or border the harvested material transport path 5. In one or some embodiments, the transparent window 17 may be transparent for all wavelength ranges recorded by the first sensor 10. In one or some embodiments, the field of vision 11 and the measuring field 14 may extend completely through the transparent window 17.

In one or some embodiments, the measuring system 9 has a light source 28. The light source 28 may be configured to emit light from some or all of the wavelength ranges recorded or sensed by the first sensor 10. In addition or alternatively, the light source 28 may be configured to sequentially emit light from some or all of the wavelength ranges recorded or sensed by the first sensor 10.

In one or some embodiments, the light source 28 irradiates the overlapping section U and/or the first section $A_1$. In a specific embodiment, the light source 28 irradiates the section $A_1$ from the direction of the first optical sensor 10. Thus, the optical sensor 10 may record or sense reflected light instead of transmitted light. In particular, it can also be provided for the light source 28 to be arranged or positioned outside of the field of vision 11.

As previously mentioned, the agricultural harvesting machine has a grain elevator 27. In this case, any one, any combination, or all of the first sensor 10, the second sensor 13, the transparent window 17, the light source 28, the housing 16 may be arranged or positioned on the grain elevator 27, such as under or over the grain elevator 27. Alternatively, any one, any combination, or all of the first optical sensor 10, the second optical sensor 13, the transparent window 17, the light source 28, or the housing 16 may be arranged or positioned behind the grain elevator 27, such as in the region of a grain tank filling system. Other possible arrangements, such as in a forage harvester in the region of a discharge chute, are also contemplated. An arrangement in front of the grain elevator 27 is also contemplated. In the last-cited case, the particular element(s) may be arranged behind the final threshing or the final separating work assembly 2.

In one or some embodiments, the overlapping section U may be part of a bottom side or top side of the harvested material flow, such as the main harvested material flow along the harvested material transport path 5. Alternatively, the agricultural harvesting machine may have a lock chamber in which the harvested material 4 is temporarily not transported at all or at least more slowly. Then, the overlapping section U may be a part of one side, such as a bottom side, of the harvested material 4 located in the lock chamber.

The lock chamber is already known in principle with respect to moisture measurements. In one or some embodiments, it may be particularly advantageous that some of the disclosed measuring principles are relatively slow and may correspondingly be advantageously used for stationary harvested material 4. The lock chambers that already exist in some harvesting machines may then be upgraded with the disclosed measuring system 9 in order to determine various harvested material parameters.

In one or some embodiments, the harvested material parameter(s) may relate to any one, any combination, or all of: a grain portion; a broken grain portion; a non-grain portion (e.g., any one, any combination, or all of a portion of awns and/or unthreshed components; straw; stem parts; silage; or a grain moisture); or a content of the harvested material 4 (e.g., a protein content and/or starch content).

In one or some embodiments, a method for operating a proposed agricultural harvesting machine is disclosed in which, using the agricultural production machine, a crop 3 is harvested and harvested material 4 is processed, wherein the measuring routine is performed using the optical measuring system 9, and wherein the analysis routine is performed using the evaluation apparatus 12. Reference is made to all statements regarding the disclosed agricultural harvesting machine.

In the method, the measuring routine and the analysis routine may be executed several times, such as iteratively or continuously. In one or some embodiments, the harvested material parameter may be determined in real time. The term "real time" may mean that only a predefined time span separates the recording or sensing of the particular image data and the determination of the harvested material parameter that, in one or some embodiments, may be less than one minute, may be less than 30 seconds, or may be less than five seconds. In response to the evaluation device determining the harvested material parameter(s), the evaluation device may cause the harvested material parameter(s) to be displayed to a user.

In particular within the context of the disclosed method, the monitoring assembly 8 may cyclically record a series of images and a series of measured values. In one or some embodiments, within a predetermined processing time after the recording or sensing of a series of images and a series of measured values, the evaluation device may then determine and display a harvested material parameter based on the series of images.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Combine
2 Work assembly
3 Crop
4 Harvested material
5 Harvested material transport path
6 Cutting unit
7 Grain tank
8 Monitoring assembly
9 Optical measuring system
10 First sensor
11 Field of vision
12 Evaluation apparatus
13 Second sensor
14 Measuring field
15 Electromagnetic sensor element
16 Housing
17 Transparent window
18 Inclined conveyor
19 Threshing concave
20 Threshing units
21 Diverter roller
22 Separating device
23 Returns pan
24 Cleaning device
25 Screening levels
26 Blower
27 Grain elevator
28 Light source
29 Processor
30 Memory
$A_1$ First section
$A_2$ Second section
U Overlapping section

The invention claimed is:

1. An agricultural harvesting machine comprising:
at least one work assembly configured to harvest a crop and to transport harvested material from the crop in a harvested material flow along a harvested material transport path through the agricultural harvesting machine; and
a monitoring assembly including at least one measuring system positioned on at least a part of the harvested material transport path and an evaluation device configured to determine at least one harvested material parameter;
wherein the at least one measuring system includes:
a first sensor, the first sensor comprising a passive optical sensor and positioned in the agricultural harvesting machine in order to generate image data indicative of light from a wavelength range in a first field of vision thereby depicting the harvested material within a first section of the harvested material flow; and
a second sensor, the second sensor comprising one or both of non-passive or non-optical and positioned in the agricultural harvesting machine in order to generate sensor data depicting the harvested material within a second section of the harvested material flow, wherein the first section and the second section at least partly overlap in an overlapping section; and
at least one transparent window positioned on the at least a part of the harvested material transport path and configured to contact on at least one side at least a part of the harvested material from the crop in the harvested material flow, the first sensor is configured to receive the light from the wavelength range through the at least one transparent window, wherein at least a part of the second sensor is positioned on the at least one transparent window and configured to sense the part of the harvested material that contacts the at least one transparent window;
wherein the evaluation device is configured to:
correlate at least a part of the image data for the overlapping section from the first sensor and at least a part of the sensor data for the overlapping section from the second sensor; and
determine, based on the correlation, the at least one harvested material parameter.

2. The agricultural harvesting machine of claim 1, wherein the second sensor is non-optical and non-passive.

3. The agricultural harvesting machine of claim 1, wherein the at least one harvested material parameter comprises at least one of composition of the harvested material or contents of the harvested material.

4. The agricultural harvesting machine of claim 1, wherein the at least one harvested material parameter comprises both of composition of the harvested material and contents of the harvested material.

5. The agricultural harvesting machine of claim 1, wherein the first sensor is configured to generate spatially-resolved image data indicative of the light within the first section;
wherein the second sensor is configured to generate spatially-resolved sensor data within the second section; and
wherein the evaluation device is configured to determine, based on the spatially-resolved image data and the spatially-resolved sensor data, the at least one harvested material parameter in a spatially-resolved manner.

6. The agricultural harvesting machine of claim 1, wherein the second sensor comprises an electromagnetic sensor element positioned on the at least one transparent window and configured to sense at least one of an electrical property or magnetic property of the second section; and
wherein the evaluation device is configured to use the sensed at least one of the electrical property or magnetic property of the second section in order to determine the at least one harvested material parameter.

7. The agricultural harvesting machine of claim 6, wherein the electromagnetic sensor element is configured to sense the electrical property of the second section; and wherein the electrical property comprises at least one of an impedance, a capacitance, an inductance, a resistance, permittivity or conductivity.

8. The agricultural harvesting machine of claim 6, wherein the electromagnetic sensor element is configured to sense the magnetic property of the second section; and
wherein the magnetic property comprises permeability.

9. The agricultural harvesting machine of claim 6, wherein the electromagnetic sensor element comprises a capacitive electrode; and
wherein the at least one measuring system is configured to operate the second sensor as a contact-free sensor.

10. The agricultural harvesting machine of claim 9, wherein the at least one measuring system is configured to measure in a projected capacitive manner using the electromagnetic sensor element.

11. The agricultural harvesting machine of claim 1, wherein the at least one measuring system includes a housing;
wherein the agricultural harvesting machine includes a grain elevator; and
wherein at least one of the first sensor, the second sensor, the at least one transparent window, or the housing is positioned on the grain elevator.

12. The agricultural harvesting machine of claim 1, wherein the second sensor is configured to contact-free sense the part of the harvested material that contacts the at least one transparent window.

13. The agricultural harvesting machine of claim 12, wherein the at least one transparent window comprises a first area through which the light from the wavelength range is received for the first sensor;
wherein the at least one transparent window comprises a second area configured for contact-free sensing, by the at least the part of the second sensor, of the part of the harvested material that contacts the at least one transparent window; and
wherein the first area and the second area at least partially overlap to form the overlapping section.

14. The agricultural harvesting machine of claim 13, wherein the first area and the second area entirely overlap.

15. The agricultural harvesting machine of claim 12, wherein the at least one transparent window comprises a first area through which the light from the wavelength range is received for the first sensor;
wherein the at least one transparent window comprises a second area configured for contact-free sensing, by the at least the part of the second sensor, of the part of the harvested material that contacts the at least one transparent window;
wherein the first area and the second area do not physically overlap one another so that the overlapping section is formed by a delay in measuring times of measurements from the first sensor and the second sensor.

16. The agricultural harvesting machine of claim 15, wherein the first area is sandwiched between multiple second areas of the contact-free sensing by the at least the part of the second sensor.

17. A method for operating an agricultural harvesting machine comprising:
harvesting a crop and transporting harvested material from the crop in a harvested material flow along a harvested material transport path through the agricultural harvesting machine;
generating, using a first sensor comprising a passive optical sensor, image data indicative of light from a wavelength range in a first field of vision thereby depicting the harvested material within a first section of the harvested material flow, wherein the light is received through at least one transparent window positioned on at least a part of the harvested material transport path, the at least one transparent window contacting on at least one side at least a part of the harvested material from the crop in the harvested material flow;
generating, using a second sensor comprising one or both of non-passive or non-optical, sensor data depicting the harvested material within a second section of the harvested material flow, wherein the first section and the second section at least partly overlap in an overlapping section, wherein at least a part of the second sensor is positioned on the at least one transparent window and senses the part of the harvested material;
correlating at least a part of the image data for the overlapping section from the first sensor and at least a part of the sensor data for the overlapping section from the second sensor; and
determining, based on the correlation, at least one harvested material parameter.

18. The method of claim 17, wherein the second sensor is non-optical and non-passive.

19. The method of claim 17, wherein the first sensor generates spatially-resolved image data indicative of the light within the first section;
wherein the second sensor generates spatially-resolved sensor data within the second section; and
wherein an evaluation device determines, based on the spatially-resolved image data and the spatially-resolved sensor data, the at least one harvested material parameter in a spatially-resolved manner.

20. The method of claim 17, wherein the second sensor is an electromagnetic sensor element that is positioned on the at least one transparent window and senses an electrical property of the second section; and
wherein the electrical property comprises at least one of an impedance, a capacitance, an inductance, a resistance, permittivity or conductivity.

* * * * *